United States Patent [19]

Murphy

[11] Patent Number: 5,160,549

[45] Date of Patent: Nov. 3, 1992

[54] TUBE FIN TRIMMING MACHINE AND METHOD FOR USE

[75] Inventor: John Q. Murphy, Wayland, N.Y.

[73] Assignee: Foster Wheeler Energy Corporation, Clinton, N.J.

[21] Appl. No.: 607,297

[22] Filed: Oct. 31, 1990

[51] Int. Cl.⁵ ............................................... B23K 7/00
[52] U.S. Cl. ..................................... 148/201; 266/54; 266/58; 266/77
[58] Field of Search ................. 266/48, 54, 71, 68, 266/77, 58; 148/9 R

[56] References Cited

U.S. PATENT DOCUMENTS 2,631,028  3/1953  Murr ..................................... 266/58
4,747,886  5/1988  Dankovic et al. ................... 148/9 R Primary Examiner—Scott Kastler
Attorney, Agent, or Firm—Marvin A. Naigur

[57] ABSTRACT

A tube fin trimming machine adapted for clamping and cutting elongated finned structures, such as finned tubes. The trimming machine includes an elongated main frame having at least one guideway, support means attached to the baseplate and adapted for supporting the finned structure a carriage unit longitudinally movable relative to the main frame and guideway, and at least one cutting torch unit movably mounted on the carriage unit. Each cutting torch is mounted above an elongated fin and is moved both longitudinally and laterally relative to the fin, so as to provide a desired elongated tapered shape for the fin. This invention also includes a method for operation of the fin trimming machine to perform desired trimming operations on elongated finned structures, such as finned tubes.

13 Claims, 6 Drawing Sheets

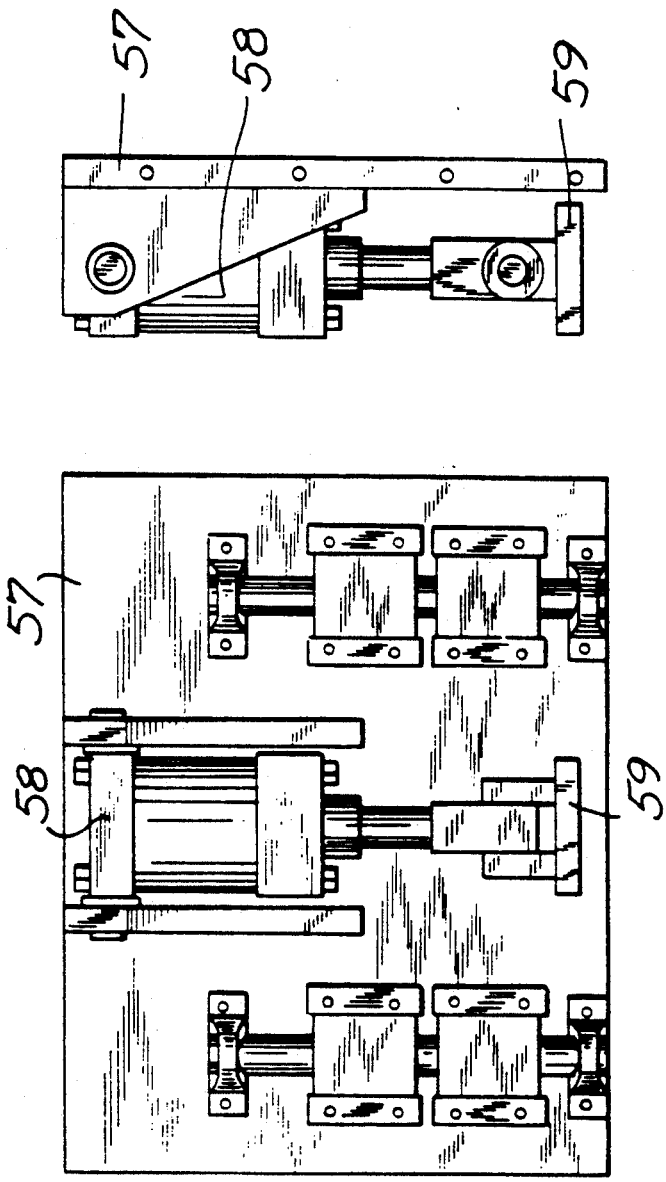

TUBE FIN TRIMMING MACHINE AND METHOD FOR USE

BACKGROUND OF INVENTION

This invention pertains to tube fin trimming machines for elongated tube fins, and pertains particularly to a tube fin trimming machine and method for accurately trimming elongated tubular structures longitudinally so as to provide precisely tapered shapes for the fins.

It is known for components of boilers and the like to have water-cooled or steam-cooled walls made of boiler tubing, to which metal flatstock material has been welded onto a tube longitudinally so as to form an elongated fin on opposite sides of the tube. When constructing certain boiler components, such as furnaces or cyclones having circular cross-sections that continuously vary in diameter, portions of the component may require that the tubes themselves be arranged locally in a converging or diverging pattern. Such constructions require that the tube fin be tapered.

Welding of fins or spacers between adjacent elongated tubes for boiler construction is disclosed by U.S. Pat. No. 3,258,577 to Smith, in which welding apparatus is moved longitudinally relative to the tube. U.S. Pat. No. 4,003,556 to Roeder and U.S. Pat. No. 4,180,248 to Benko disclose flame cutting machines utilizing a moving torch carriage configuration. U.S. Pat. No. 4,471,948 to Holmes discloses apparatus for torch cutting elongated members such as rails. U.S. Pat. No. 4,747,886 to Dankovic et al discloses a device for torch cutting fins from elongated tubes. Also, U.S. Pat. No. 4,798,321 to Moran discloses a panelizing machine used for welding together adjacent finned tubes by longitudinal movement of the welding apparatus relative to the tubes, so as to form wall panels useful in steam boiler construction. However, the known prior art has apparently not provided a device suitable for performing accurate longitudinal trimming of such finned tubes in a rapid and efficient manner.

SUMMARY OF INVENTION

The present invention provides apparatus and method for performing cutting operations on elongated fins of tubular structures having fins which have been welded to the elongated structure, so as to remove a portion of the fin material and leave a fin on either side of the tubular structure, with the fin having a desired tapered shape. Such elongated finned tubes having desired tapered fin shapes can then be advantageously welded together so as to form panel walls for steam boilers.

The fin trimming machine includes an elongated base plate or frame having at least one guideway, extending parallel to the baseplate support means attached to the baseplate and adapted for supporting an elongated finned tubular structure, a carriage unit which is longitudinally movably attached to the baseplate and guideway, and at least one cutting torch unit movably mounted on the carriage unit above the longitudinally finned tubular structure, so as to be transversely and vertically movable relative to the finned tubular structure or tube. In operation, the carriage unit is moved longitudinally relative to the fins, and the cutting torch unit is adjusted vertically and is moved transversely relative to the fins by elongated cam surfaces rigidly attached to said baseplate, so as to trim the tube fin(s) to a desired shape.

This invention also includes a method for producing trimmed elongated structures using the fin trimming machine. This method includes the steps of placing at least one elongated finned structure onto an elongated stationary support, and clamping the elongated finned structure onto the support structure, locating at least one cutting torch above the finned structure, moving the torch longitudinally and laterally relative to the finned structure, and trimming the fins to a desired tapered shape. The elongated trimmed fin structure is then unclamped from the stationary support, another elongated finned structure is inserted, and the process is repeated as desired. The elongated finned structure is usually tapered evenly on each side of the structure, which is preferably a finned tube having outside diameter of 0.75-3 inch with each fin having a width of 0.75-3 inches.

BRIEF DESCRIPTION OF DRAWINGS

This invention will be described further by reference to the following drawings, in which:

FIGS. 10 and 11 show additional views of the torch unit piston actuator adapted for torch movement according to the invention in various stages of assembly.

DESCRIPTION OF INVENTION

Figure 1:
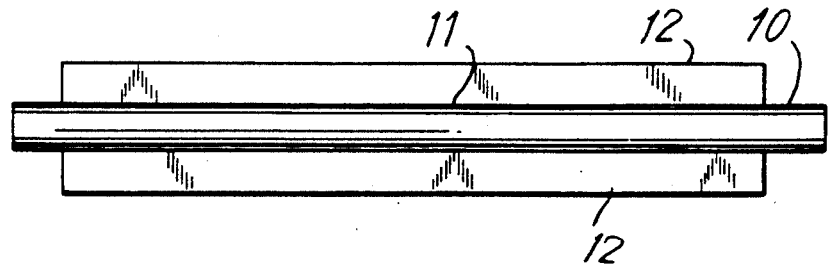
FIG. 1 shows a plan view of an elongated finned tube before trimming the fins to a desired shape.
Figure 2:
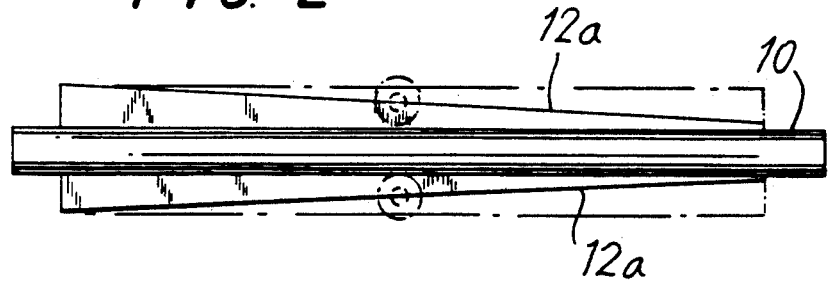
FIG. 2 shows a plan view of the elongated finned tube after trimming the fins to have a desired tapered shape.

As shown by FIG. 1, an elongated fin-tube structure 10 has dual fins 12 welded at 11 onto the tube along opposite sides of the tube, as shown before trim cutting the fins. FIG. 2 shows a similar view of the finned tube 10 illustrating the result of a trimming operation performed on the fins 12a according to the invention to provide a tapered shape.

Figure 3A:
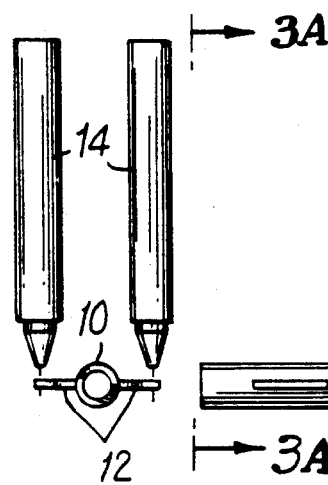
FIG. 3A is a view taken at line 3A—3A of FIG. 3 and shows dual torches disposed above opposite sides of the tube.
Figure 3:
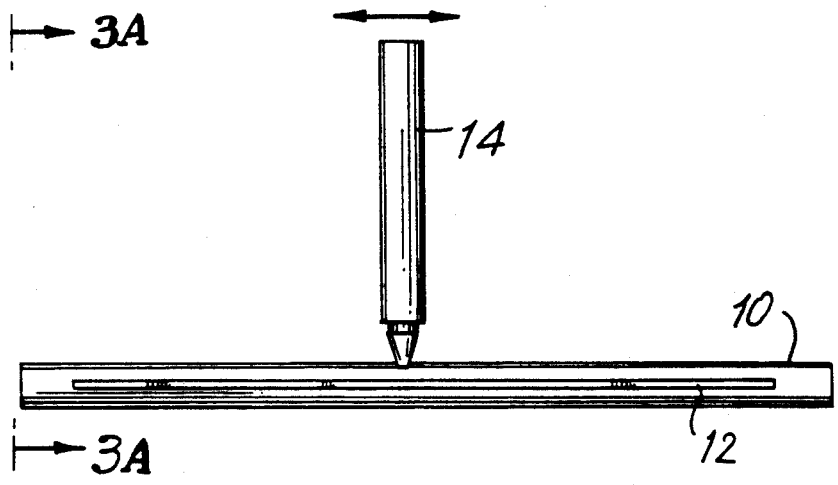
FIG. 3 schematically shows a cutting torch disposed above the finned tube and made longitudinally movable relative to the tube.

As generally shown in FIG. 3, a cutting torch 14 is disposed above fins 12 of the fin-tube 10 and is movable longitudinally and transversely relative to the stationary tube, each torch 14 trim cutting its respective fin 12. FIG. 3A shows an end view of dual cutting torches 14 provided above the fins 12. Theoretically, the fin-tube 10 and torches 14 require only relative translation type motion. However in the illustrated and preferred embodiment of the invention, the fin-tube 10 is held stationary while the torches 14 are moved longitudinally and transversely relative to the tube 10.

Figure 4:
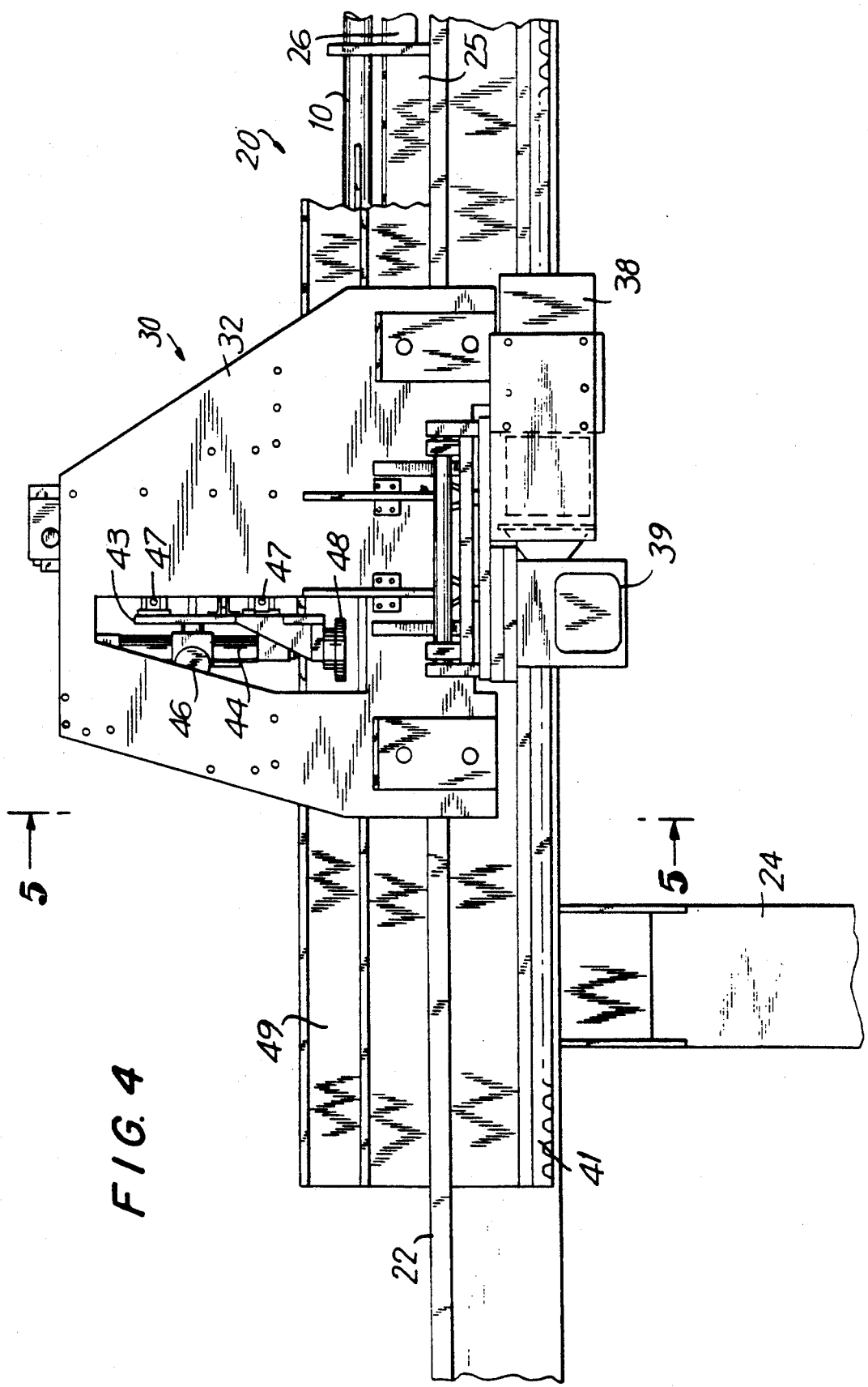
FIG. 4 shows a partial longitudinal side view of the tube fin trimming machine including the base plate and support, and longitudinally movable carriage unit.

FIG. 4 shows a partial longitudinal side view of the tube fin trimming machine 20, which includes an elongated base plate 22 attached to a suitable support 24 provided near each end of the machine. An elongated finned tube 10 is supported on the baseplate member 22 by an elongated support member 25 and a plurality of spaced apart v-blocks 26.

A carriage unit 30 is movably mounted on the base plate 22, and includes dual vertical side plates 32 which are spaced apart on each side of the finned tube 10. The dual side plates 32 are mounted on baseplate 22 by two sets of dual rollers 34 and 36. The dual rollers 34 simply contact the upper and lower sides of the base plate 22 along one edge thereof, while roller set 36 includes lower a roller 36a which is guided by a guideway in the form of elongated guide rail 37 located below and attached along the opposite edge of baseplate 22. Carriage unit 30 is moved longitudinally relative to baseplate 22 by means of electric motor 38, and gear reducer 39, which are attached to one of the side plates 32 and rotate a spur gear 40 against rack 41 attached below base plate 22, as better shown by FIG. 5.

Figure 5:
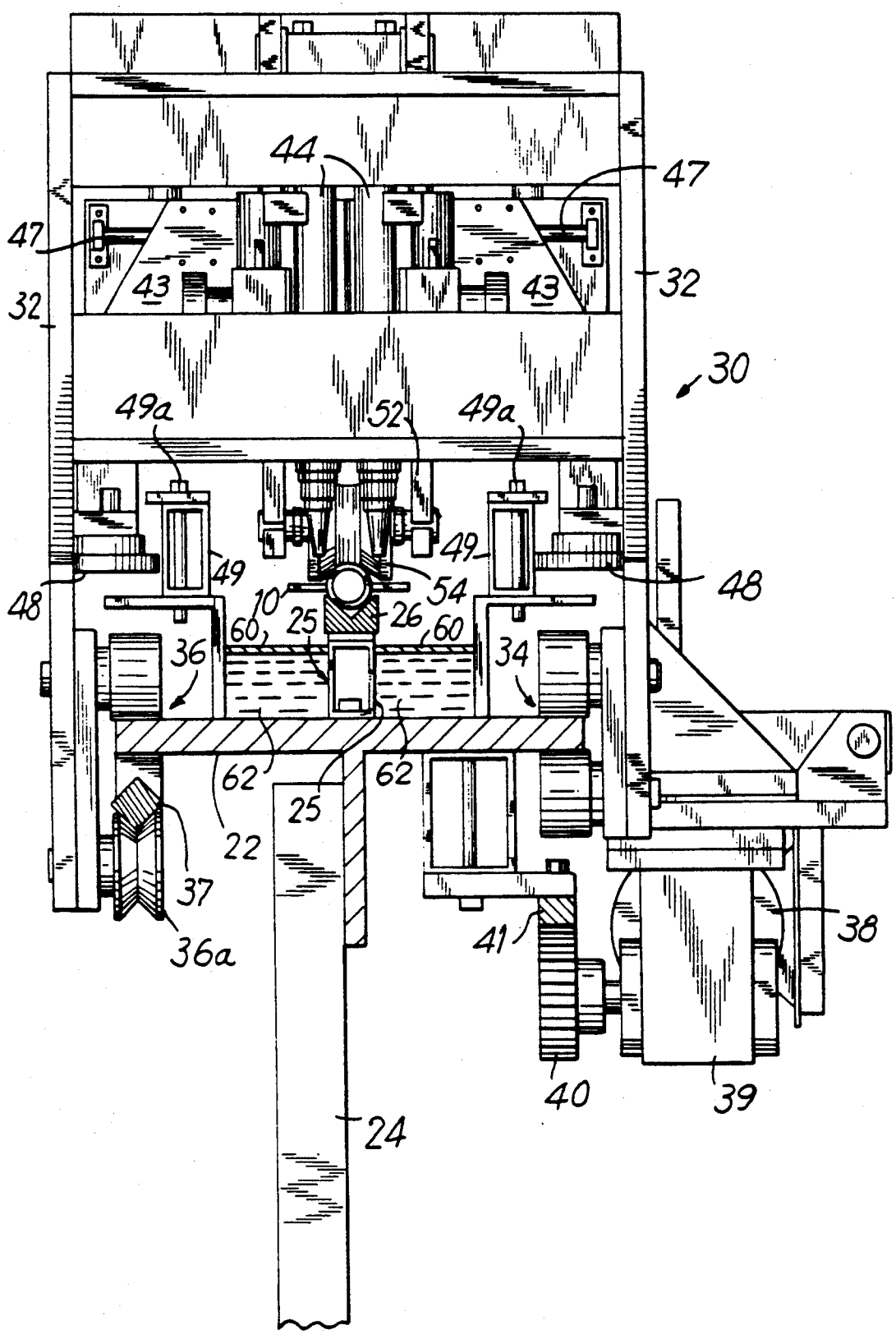
FIG. 5 shows a cross sectional view of the tube fin trimming machine taken at line 5—5 of FIG. 4.

Carriage unit 30 supports dual cutting torch units 42, which are each movably mounted vertically on a front mounting plate 43 located between the dual side plates 32. One of the dual torch units 44 movably mounted to the carriage unit 30 is shown through an opening in a side wall 32 of the carriage unit 30 in FIG. 4. Additional important details of the carriage unit 30 are shown by FIG. 5, which is a cross sectional view showing a fin-tube 10 held against support 25 and one of a series of V-blocks 26, with the dual cutting torches 44 being each disposed above a fin 12. Each torch 44 is vertically mounted on elements adapted for providing vertical and transverse movements for each torch 44 relative to the finned tube 10.

The FIGS. 6-11 show various front and side views of the cutting torch units 42 provided on the carriage unit 30.

More particularly, the dual cutting torches 44 are each movably disposed above a dual fin 12. Each torch 44 is adjustably mounted with respect to a front plate 43 and fins 12 by means of a rack and pinion 45 and a hand wheel 46. Each front plate 43 for torch 44 is mounted for transverse movement on dual horizontal linear bearings 47. Such transverse movement of front mounting plates 43 is effected by a cam follower 48 in the form of a roller provided at the lower edge of each front plate 43. The cam followers 48 track against planar adjustable cams 49 (FIGS. 4 and 5). The elongated adjustable cams 49 are mounted by a plurality of fasteners 49a such as bolts or the like, which may be loosened for adjusting the slope of each cam 49 with respect to longitudinal distance. The slope of the elongated cam 49 relative to the guideway 37 controls the slope of the taper cut for the tube fins 12.

An air cylinder actuator 50 (FIG. 7) is mounted on opposite ends thereof to respective ones of the plates 43. The air cylinder 50 serves to bias the dual mounting plates 43 and torches 44 toward each other. In this manner, each cam follower 48 is biased against its respective linear cam 49 and, in turn positions each torch 44 in its respective transverse location.

Figure 7:
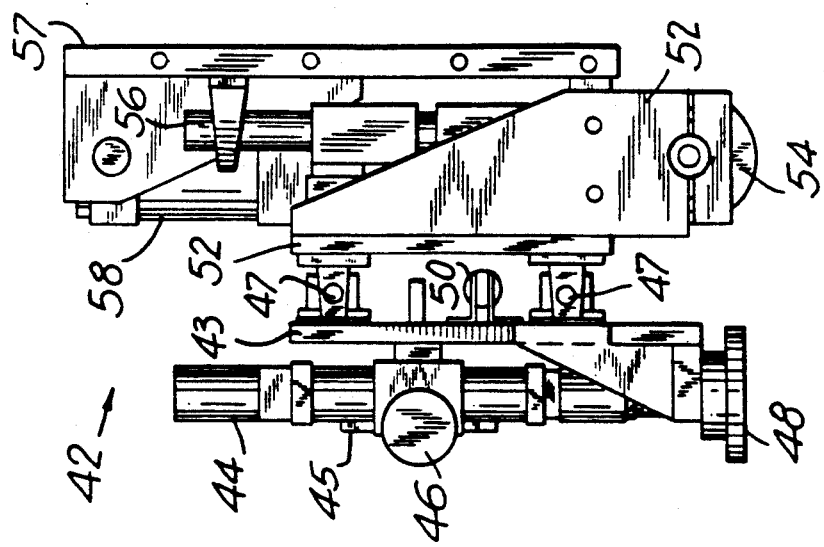
FIG. 7 shows a detailed side view of the cutting torch unit mounting arrangement.
Figure 6:
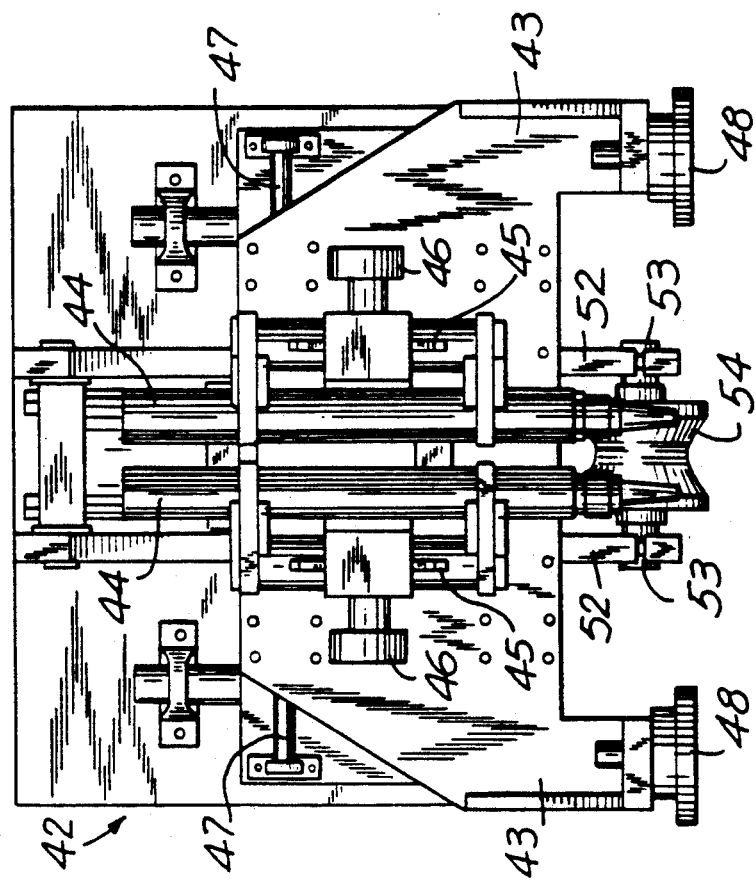
FIG. 6 shows a detailed front view of the dual cutting torch unit mounting arrangement and guiding rollers.
Figure 9:
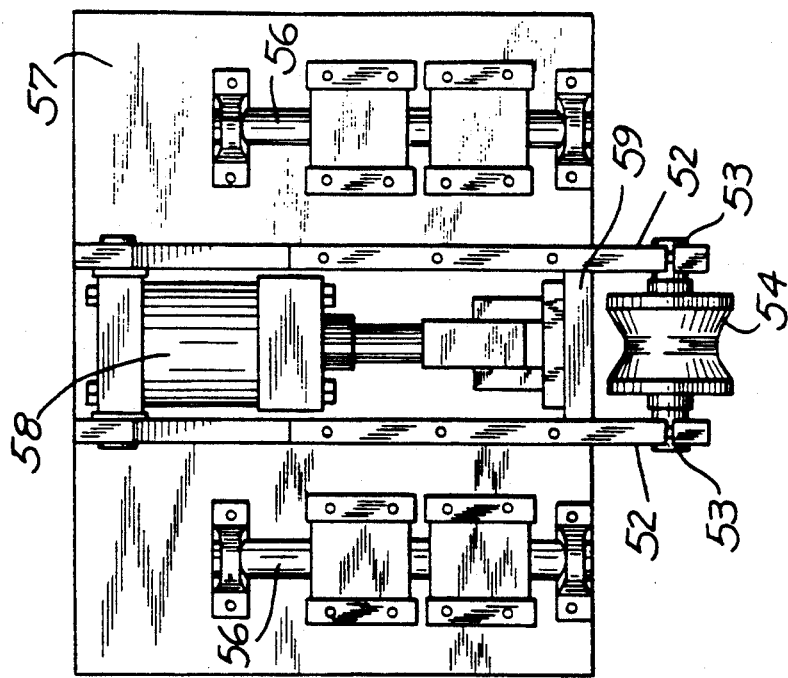
FIG. 9 shows the torch unit piston actuator and guide roller elements similar to FIG. 8.
Figure 8:
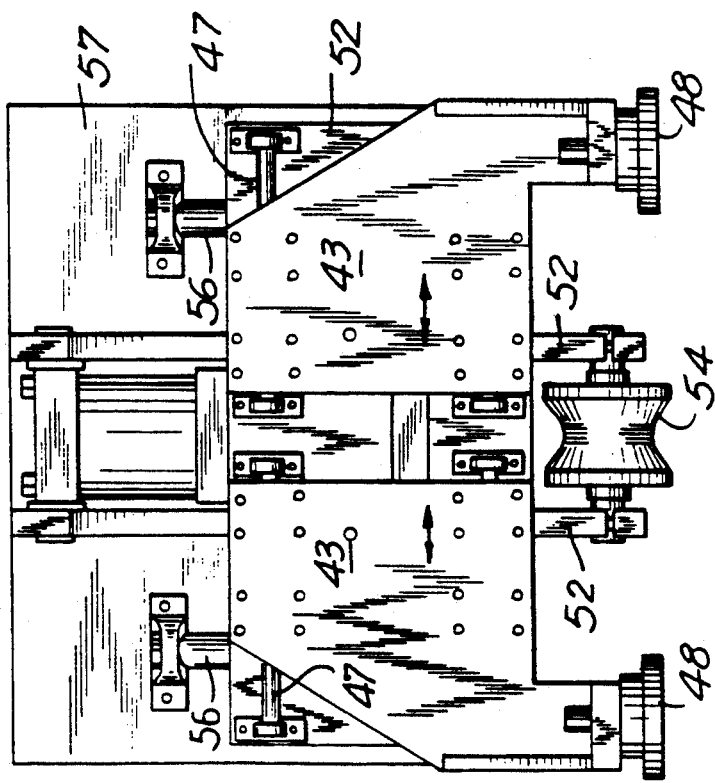
FIG. 8 shows the torch unit mounting equipment of FIG. 6 but without the dual cutting torches.

The upper and lower horizontal linear support bearings 47 are attached to a rear vertical mounting bracket 52 (FIG. 7). This mounting bracket 52 has v-shaped roller 54 rotatably mounted at its lower end by bearings 53 in a position to contact the finned tube 10. The bracket 52 and attached roller 54 are made vertically movable by dual linear bearing units 56, which are each attached to a rear plate 57. The roller 54 is vertically movable by a fluid piston 58, which is also attached to the rear plate 57 by clevis block 59. It can be seen from the FIGS. 6-11 that extension of the air cylinder actuator 58 not only provides downward motion of the bracket 52 and roller 54 to press the fin tube 10 against the V-blocks 26, but also causes downward motion of the dual cutting torches 44 and the dual cam followers 48.

As best shown in FIG. 5, a pair of metal plates 60 are preferably provided extending longitudinally of the main base plate 22 in order to form a water jacket 62. Cooling water is circulated longitudinally within the jackets 62 in order to remove undesired heat generated by the cutting torches 44 in support member 22 during tube fin trimming operations.

During operation of the fin trimming machine 20, the carriage unit 30 travels the length of the main base plate support structure 22 by operation of electric motor 38, gear reducer 39, driving spur gear 40 in contact with the gear rack 41. During the fin cutting operation, the finned tube 10 is held firmly against a series of V-blocks 26 (FIGS. 4 and 5) by a downwardly-biased roller 54, which presses down on the finned tube 10. Because the roller 54 is rotationally mounted on bracket 52, which in turn is mounted for vertical motion relative to rear plate 57 by linear bearings 56, the vertical motion or roller 54 is achieved by piston actuator 58 mounted on the carriage 30.

EXAMPLE

A tube fin trimming machine is provided which has an elongated main frame including a guideway each 20 ft. long. A carriage unit is longitudinally movable on the main frame and guideway, and carries dual cutting torches which are oriented substantially vertically above a tube having dual fins. The carriage unit is longitudinally movable relative to the main frame and finned tube by a gear motor drive unit and pinion gear contacting a rack. The cutting torches are laterally movable and are guided by roller cams which each follow an elongated guide surface, and provide a tapered cut on each fin of the elongated tube. Typical characteristics and dimensions of the tube fin trimming machine are as follows:

| | |
|---|---|
| Main frame length, ft. | 20 |
| Main frame width, ft. | 3 |
| Finned tube length, ft. | 20 |
| Tube fin width, in. | 4 |
| Torch vertical movement, in. | 6 |
| Longitudinal movement rate for carriage uni, ft/min | 10-15 |

Although this invention has been described broadly and in terms of a preferred embodiment, it is understood that desirable modifications and variations can be made to the fin trimming machine and its operation all within the scope of the invention, which is defined by the following claims.

I claim:

1. A fin trimming machine adapted for trimming longitudinal fins on elongated tubular structures, the machine comprising:

(a) an elongated base plate having at least one guideway extending parallel with said base plate;
(b) support means attached to said base plate and adapted for holding an elongated finned tubular structure;
(c) a carriage unit supported on said base plate and which is longitudinally movable along said guideway, said carriage unit including dual side members which are spaced apart on each side of said support means; and
(d) at least one cutting torch unit moveably mounted on said carriage unit, said torch unit being located above a fin of the elongated finned tubular structure and being laterally and vertically movable relative to the finned tubular structure, whereby the cutting torch can be moved both longitudinally and laterally relative to the tubular structure fins so as to trim the fins to a desired shape.

2. A fin trimming machine according to claim 1, including a geared motor drive means located below said baseplate for controlling the longitudinal movement of said carriage unit relative to said baseplate.

3. A fin trimming machine according to claim 1, including dual cam guide surfaces rigidly attached to said base plate and dual guide rollers attached to said carriage unit, with said cam surfaces and guide rollers both being used for controlling lateral movement of each said torch unit relative to the finned tubular structure.

4. A fin trimming machine according to claim 1, wherein each said cutting torch unit is vertically movable by means of a piston actuator.

5. A fin trimming machine according to claim 1, wherein said guideway is located below said baseplate.

6. A fin trimming machine according to claim 1, wherein said tube support means comprises a plurality of v-blocks spaced apart below the elongated finned tubular structure, and a vertically movable roller located above the elongated finned tubular structure for pressing downwardly on the finned tubular structure.

7. A fin trimming machine according to claim 1, wherein a water cooling jacket is attached to said base plate below said tube support means for cooling the finned tubular structure.

8. A fin trimming machine according to claim 1, wherein dual cutting torches are provided equally spaced on each side of the finned tube;

9. A fin trimming machine according to claim 1, wherein a cooling jacket is provided adjacent said base plate for cooling the base plate.

10. A fin trimming machine adapted for trimming longitudinal fins on elongated tubular structures, the machine comprising:
(a) an elongated base plate having at least one guideway extending parallel with and below said base plate;
(b) support means attached to said base plate and adapted for holding an elongated finned tubular structure;
(c) a carriage unit supported on said base plate and being longitudinally movable along said guideway, said carriage unit including drive means for moving the carriage unit longitudinally relative to said baseplate, and including dual side members which are spaced apart on each side of said support means; and
(d) dual cutting torch units moveably mounted on said carriage unit, each said torch unit being mounted above a fin of the elongated finned tubular structure and being laterally and vertically movable relative to the finned tubular structure, and including cam means for controlling lateral movement of each said cutting torch unit relative to the finned tubular structure, whereby the cutting torches can be each moved longitudinally and laterally relative to the tubular structure fins so as to trim the fins to a desired tapered shape.

11. A method for producing trimmed elongated tubular structures, including the steps of:
(a) placing at least one elongated finned tubular structure onto an elongated stationary support structure mounted on an elongated base plate, and clamping said elongated finner tubular structure onto said support structure;
(b) locating at least one cutting torch in a carriage unit which is longitudinally movable on said base plate, said cutting torch being above the finned tubular structure, moving the torch longitudinally and laterally relative to said finned tubular structure, guiding the cutting torch by a cam surface attached to the base plate; and trimming the finned tubular structure to a desired tapered shape; and
(c) unclamping the elongated trimmed finned tubular structure from the stationary support structure.

12. The method of claim 11, wherein said elongated finned structure is tapered evenly on each side of the support structure.

13. A fin trimming machine according to claim 3, wherein said carriage unit includes dual cutting torch units which are each mounted on a front mounting plate (43) said cutting torch units being laterally moveable and biased towards each other and the dual guide surfaces by an actuator piston (50).

* * * * *